United States Patent
Aguilera

[11] Patent Number: 5,626,222
[45] Date of Patent: May 6, 1997

[54] FORCE CONTROLLABLE SHIELDED MECHANICAL SWITCH ACTUATORS

[76] Inventor: Rafael E. Aguilera, 126 Greenapple Way, Simpsonville, S.C. 29681

[21] Appl. No.: 540,230

[22] Filed: Oct. 6, 1995

[51] Int. Cl.$^6$ ........................................ H01H 9/02
[52] U.S. Cl. .................. 200/305; 200/341; 200/302.2
[58] Field of Search .................. 200/341, 515, 200/516, 517, 512, 521, 520, 302.2, 305; 277/212 FB

[56] References Cited

U.S. PATENT DOCUMENTS

| | | | |
|---|---|---|---|
| 3,238,344 | 3/1966 | Miachon | 200/302.2 |
| 3,950,628 | 4/1976 | Hruda | 200/302 |
| 4,235,427 | 11/1980 | Bialobizeski | 277/212 FB |
| 4,243,857 | 1/1981 | Reis | 200/83 |
| 4,453,061 | 6/1984 | Tamura | 200/306 |
| 4,540,864 | 9/1985 | Krasser et al. | 200/302.2 |
| 4,596,912 | 6/1986 | Hattori | 200/302.2 |
| 4,766,272 | 8/1988 | Guzzon | 200/302.2 |
| 4,922,066 | 5/1990 | Crow et al. | 200/80 R |
| 5,311,912 | 5/1994 | Hayward | 277/212 FB |

FOREIGN PATENT DOCUMENTS 789752   1/1958   United Kingdom ................ 200/302.2

*Primary Examiner*—David J. Walczak

[57] ABSTRACT

A mechanical switch in a laptop computer or other electronic equipment is surrounded by a protective, electrostatically shielding bellow-shaped housing that is formed from a nickel metal. Preferably formed by casting, the bellows has a sidewall thickness of about 0.06 mm to about 0.12 mm, a diameter ranging from about 2.6 mm to about 10 mm, and a compressive actuation displacement ranging from about 2 mm to about 8 mm. The number, shape and thickness of convolutions or pleats comprising the bellow may be designed to tailor the actuation force vs. actuation travel stroke transfer function. A substantially linear transfer function is achieved by providing a constant thickness housing wall and a constant convolution pitch. The housing produces good protection against water and dust, good tactile feedback, yet is cost and weight competitive with prior art rubber housings.

21 Claims, 7 Drawing Sheets

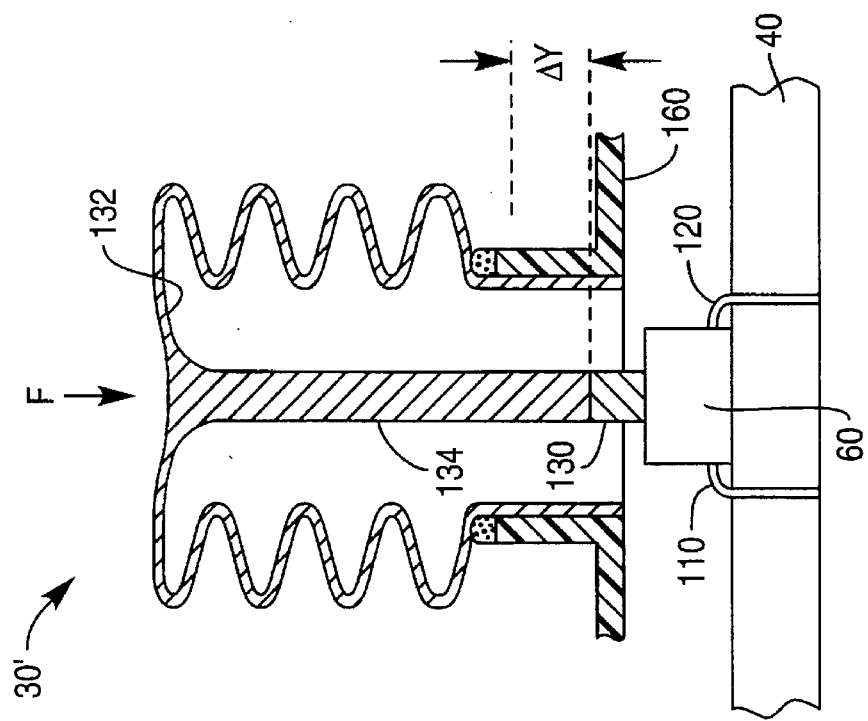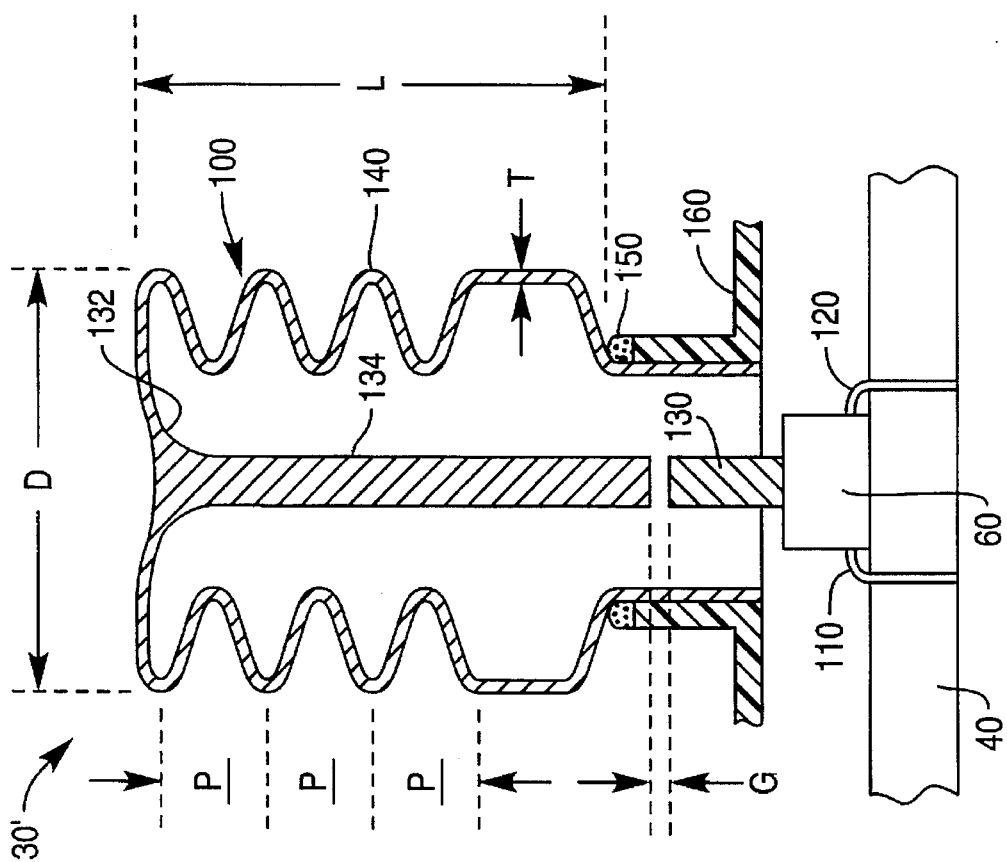

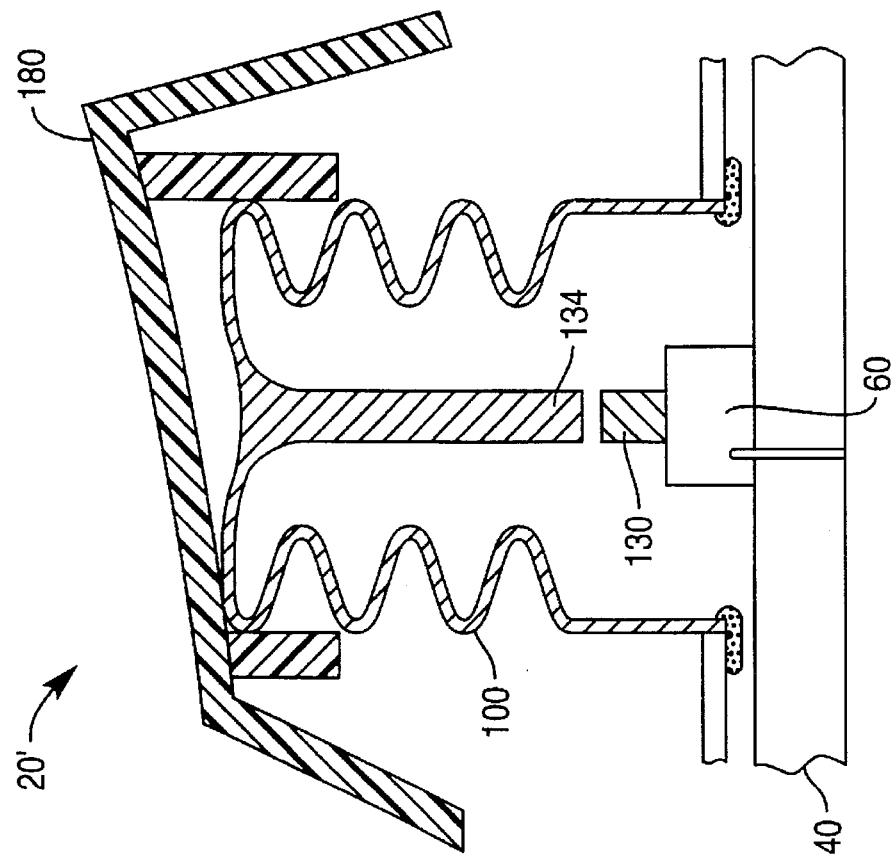
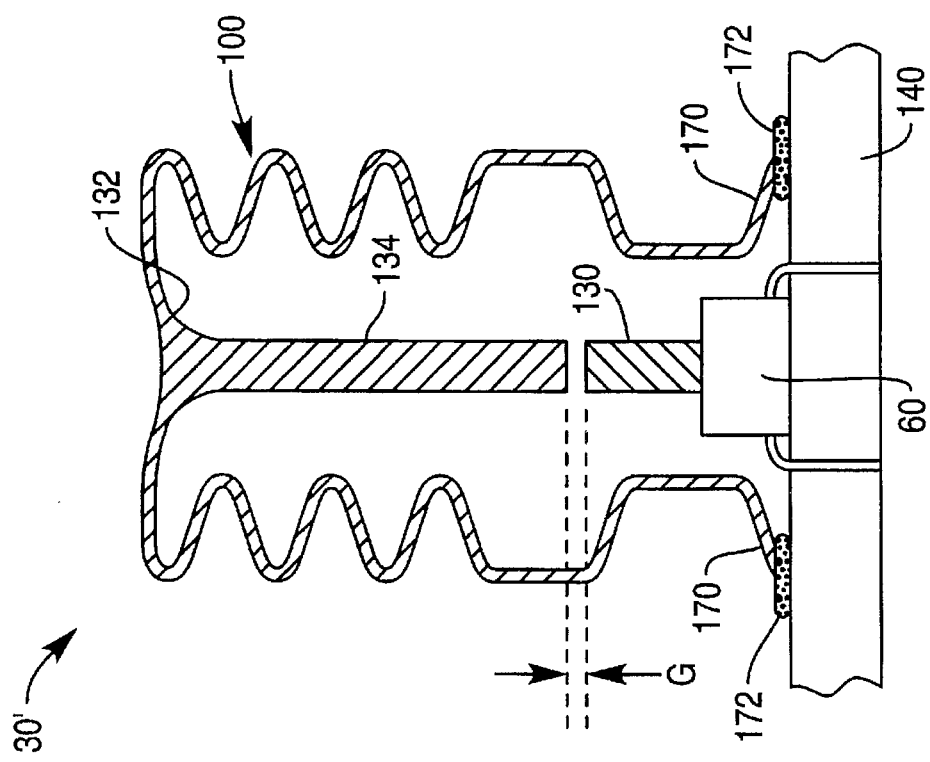

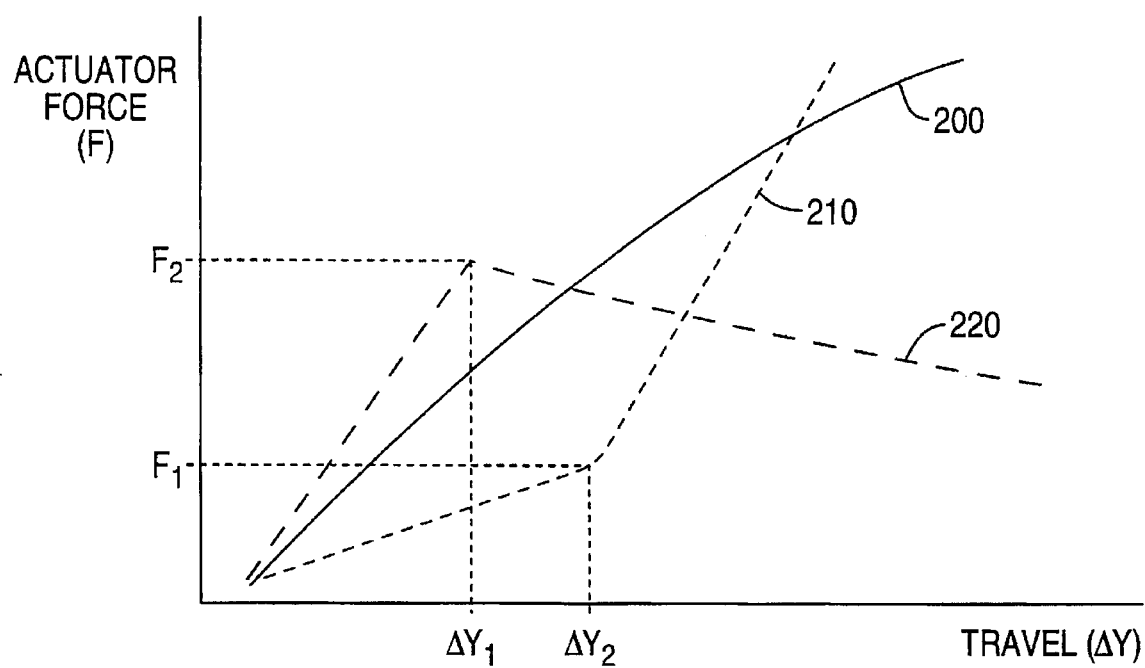

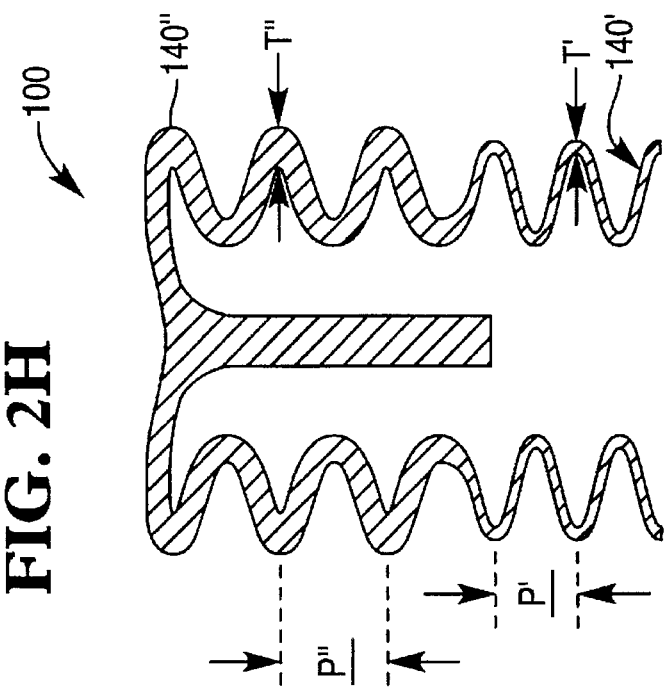
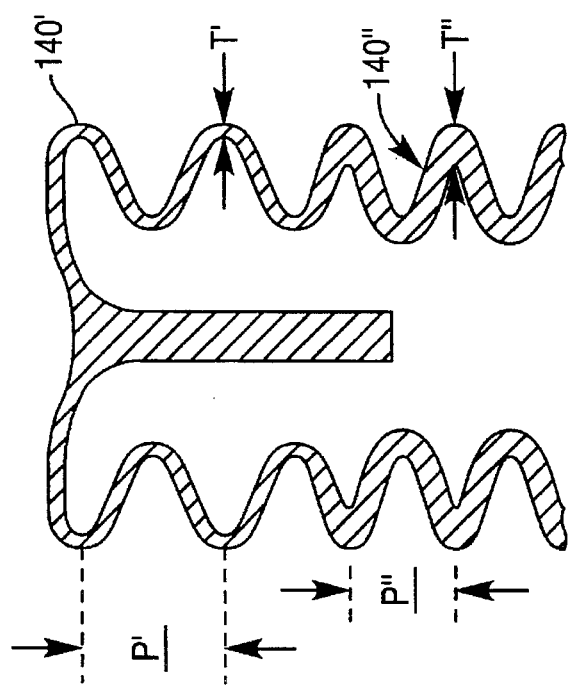

FORCE CONTROLLABLE SHIELDED MECHANICAL SWITCH ACTUATORS

FIELD OF THE INVENTION

The present invention relates generally to mechanical switch actuators, and more specifically to providing shielded, force controllable, mechanical switch actuators for use in laptop computers.

BACKGROUND OF THE INVENTION

Modern battery powered laptop computers such as computer 10 shown in FIG. 1A weigh less than perhaps 6 pounds (13.2 Kg) and may see use in environments ranging from humid rain forests to dusty deserts. Understandably, within computer 10 it is important that the keyboard switches 20, and other mechanical switches 30, e.g., the computer ON/OFF switch, be moisture and dust resistant. Shown in partial cutaway in FIG. 1A is keyboard switch 20', attached to the motherboard or other substrate 40 and surrounded by a dome-shaped typically rubber housing 50.

FIG. 1B is a detailed cross-sectional view of prior art mechanical switch 20', a switch commonly found in laptop computers and other equipment intended to function in wet, dusty, or other hostile environments. A mechanical switch mechanism 60 is attached to a motherboard or other substrate 40, and is surrounded by a flexible dome-shaped housing 50 that is sealingly attached with adhesive 70 or the like to the substrate. Mechanism 60 typically includes an actuator 80 that is biased with a spring 90. Upon activation by a downward force F upon an external keycap or button 100, spring-loaded actuator 80 moves downward a distance $\Delta Y$ and makes electrical contact between first and second conductors 110, 120, one of which may be ground. As such, switch 20' changes from a first switching state (e.g., electrical "open") to a second switching state (e.g., electrical "short") between conductors 110 and 120.

Housing 50 should be flexible and should provide a hermetic seal that protects mechanism 90 from moisture, dust and the like. commonly, housing 50 is fabricated from rubber. But although switch actuator 90 may have a projected lifetime of a million operations or more, in practice the ability of housing 50 to seal against water and dust may be degraded after a few months. Repeated flexings, temperature extremes and general ageing can cause housing 50 to loose flexibility and wear out, developing cracks through which moisture and/or dust can penetrate. Further, the interface 70 between housing 50 and substrate 40 can deteriorate, providing further leakage paths into actuator 90. The unfortunate result can be intermittent functioning or even malfunctioning of switch 20'.

In addition to susceptibility to deterioration, the use of rubber or other non-conductive housing material 50 is detrimental in that it does not provide electrostatic shielding for the switch actuator 90 within. A user of computer 10 or other equipment associated with switch 20' may walk across a floor, building up static electricity that is discharged into equipment 10 when the user attempts to touch or use switch 20'.

Another undesirable aspect of prior art actuator switch mechanisms is the non-linear transfer function of user-generated actuation force (F) as a function of actuator travel ($\Delta Y$) that is created by the dome-shaped housing 50. FIG. 1C depicts the typically "S"-shaped transfer function curve that is characteristic of such assemblies. Initially, increasing F increases the travel distance $\Delta Y$ but as the rubber dome 50 begins to compress downward, $\Delta Y$ increases with decreasing force, until in a somewhat compressed configuration the dome again begins to exhibit a linear transfer function of F vs. $\Delta Y$. The S-shaped transfer function makes it difficult to design such switches to provide adequate tactile feedback for the user, while permitting efficient switch operation.

The transfer function characteristic is further complicated because the presence of a rubber housing requires even greater activation force, requiring the user to press harder to activate the switch mechanism. These requirements are especially important for laptop computer keyboard use, where actuator travel, actuation force, and tactile feedback should be predictable within a desired operating range In summary, what is needed is a mechanical switch actuator that is moisture proof, and that can stand repeated operation. Such mechanism should also provide electrical shielding and a preferably substantially linear transfer function between actuation force and actuator travel. Preferably such actuator should not contribute substantial weight or cost to the laptop computer or other electronic device.

The present invention discloses such an actuator switch.

SUMMARY OF THE INVENTION

The present invention surrounds a mechanical switch actuator with a thin metal flexible-walled, bellows-like, closed housing that can sustain many million cycles of switch operation. Preferably cast from a nickel metal, the housing surrounds and can electrostatically shield a mechanical switch actuator, as well as providing a barrier against moisture and dust entry. The base of the housing may be attached to the switch actuator housing by insert molding, epoxy bonding, press fitting with a polymeric seal, or may be attached to the motherboard or substrate containing the switch actuator by soldering. The flexible bellows produces a substantially linear force vs. actuator travel transfer function, as well as good tactile feedback as the switch changes between open and closed switch states. Further, the number and thicknesses of the bellows convolutions may be tailored to produce a desired transfer function, including a non-linear transfer function.

Other features and advantages of the invention will appear from the following description in which the preferred embodiments have been set forth in detail, in conjunction with the accompanying drawings.

BRIEF DESCRIPTION OF THE DRAWINGS

FIG. 2B is a sectional view of a mechanical switch actuator surrounding by a shielding flexible housing, according to the present invention;

FIG. 2C is a sectional view of a mechanical switch actuator in a deflected disposition;

FIG. 2D is a sectional view of a second embodiment depicting a grounded shielding flexible housing, according to the present invention;

FIG. 2E is a sectional view of a keyboard-type keyswitch, according to the present invention;

FIG. 2F depicts the substantially linear force vs. actuator travel transfer function for the switch shown in FIGS. 2B–2E;

FIG. 2G depicts a switch housing whose transfer function slope increases after an initial deflection, according to the present invention;

FIG. 2H depicts a switch housing whose transfer function slope decreases after an initial deflection, according to the present invention.

DETAILED DESCRIPTION OF THE PREFERRED EMBODIMENTS

Figure 1A:
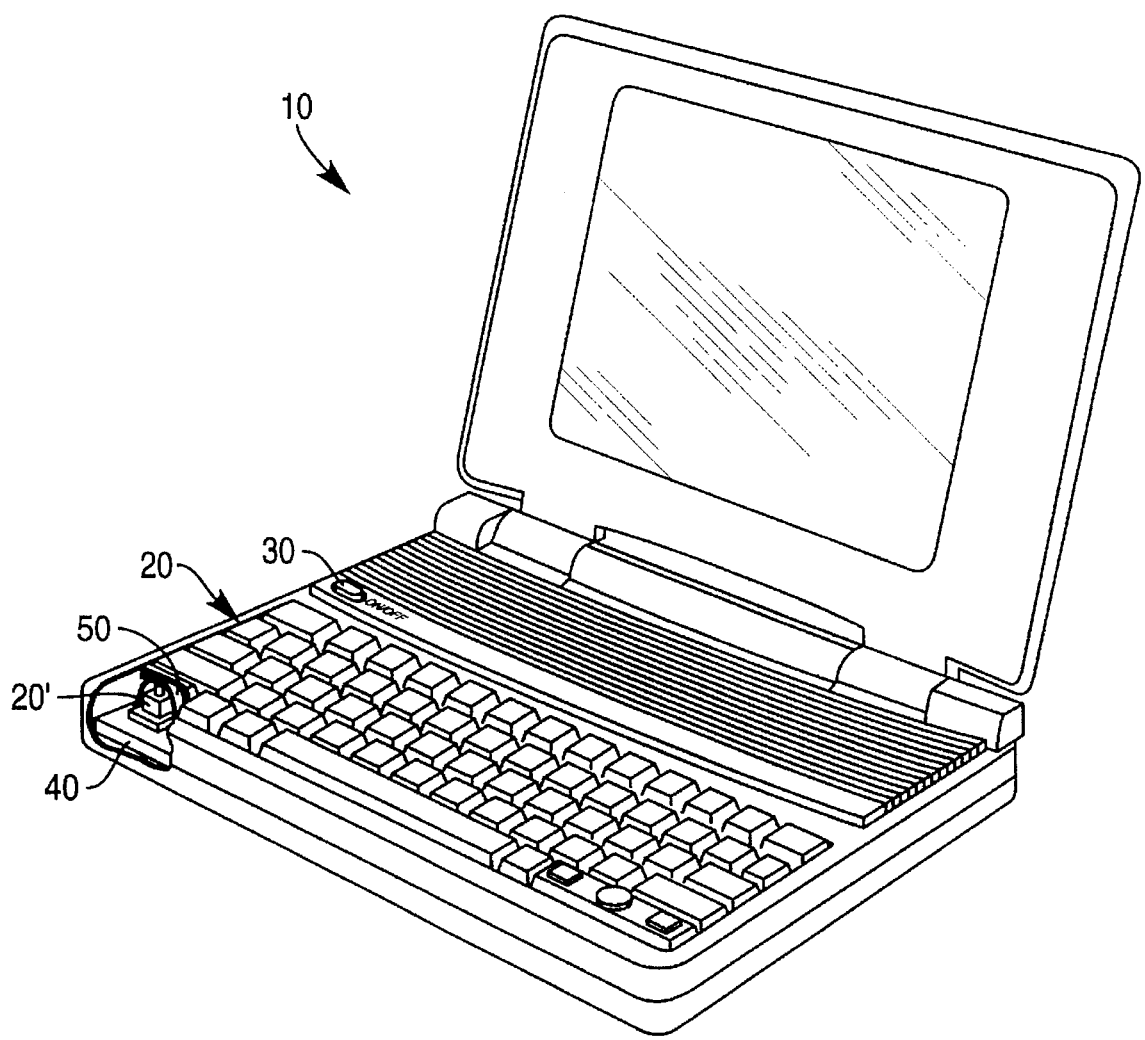
FIG. 1A depicts a generic laptop computer, according to the prior art.
Figure 1B:
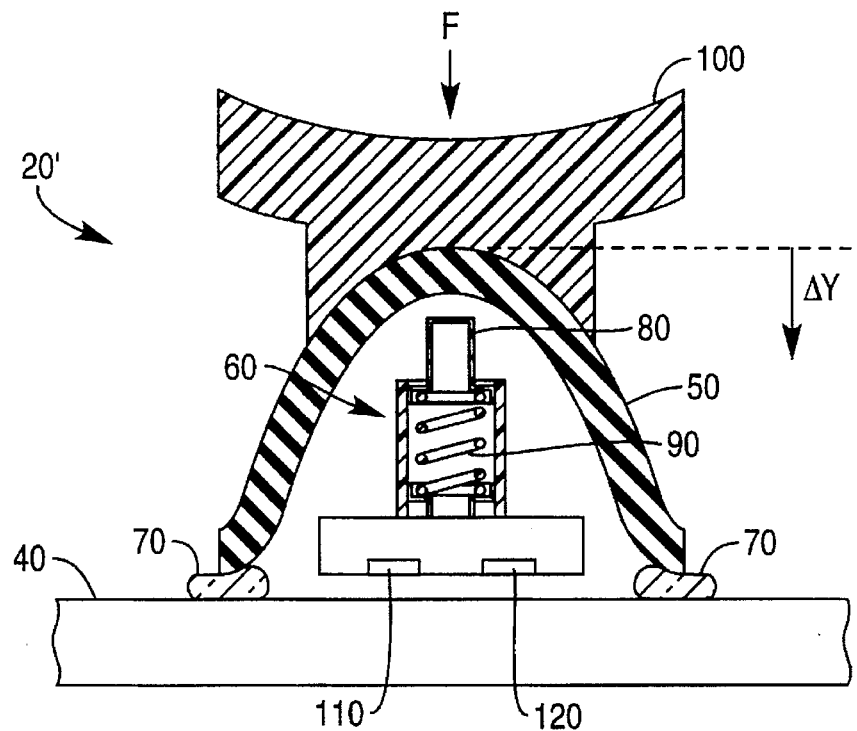
FIG. 1B is a sectional view of a mechanical switch actuator surrounded by a flexible rubber housing, according to the prior art.
Figure 1C:
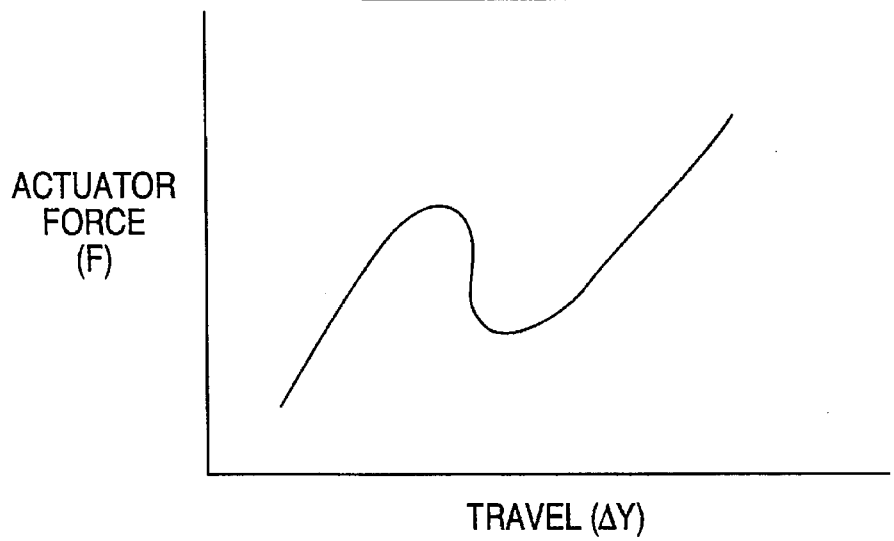
FIG. 1C depicts the generally "S"-shaped force vs. actuator travel transfer function of the prior art switch shown in FIG. 1B, according to the prior art.
Figure 2A:
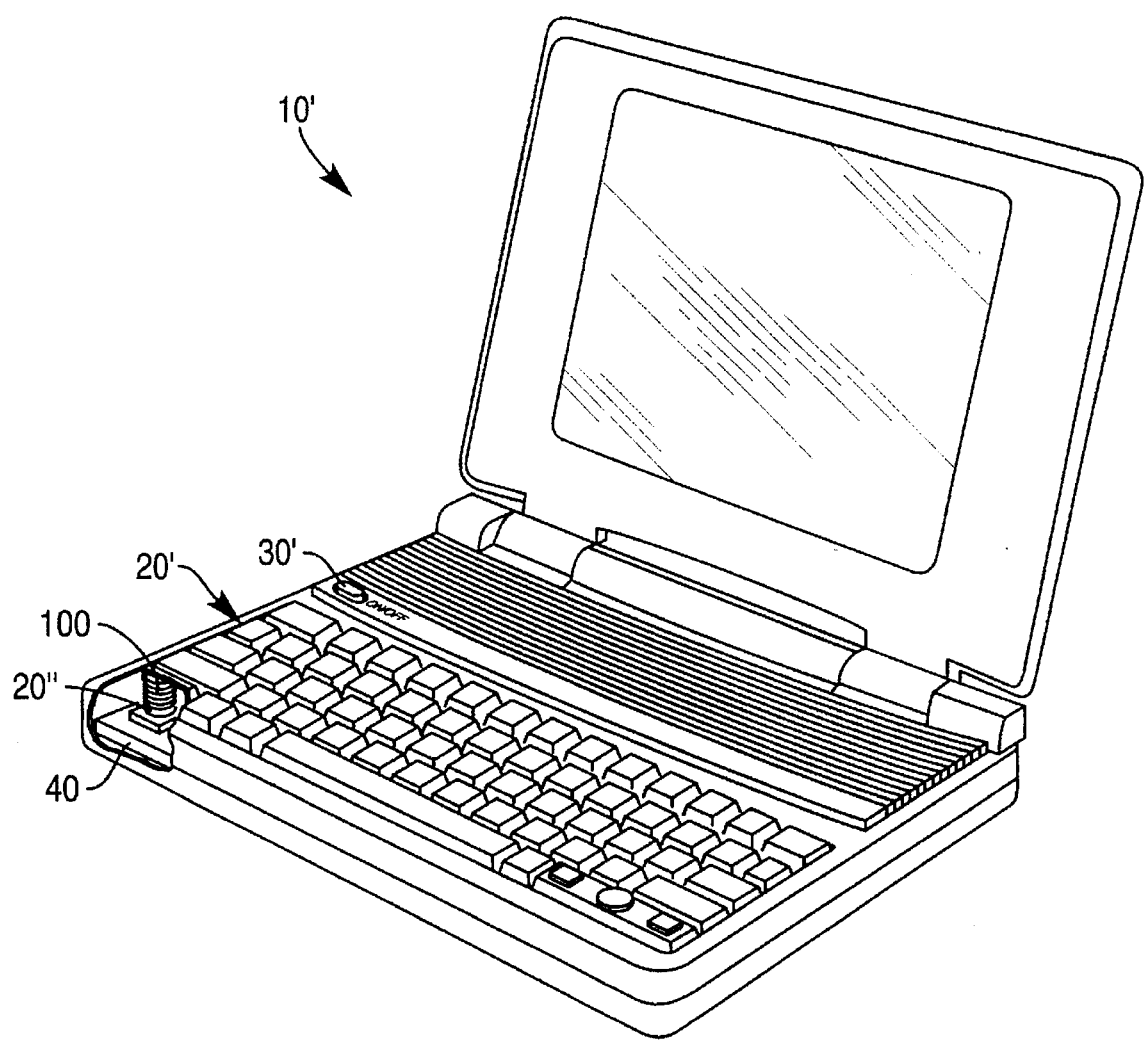
FIG. 2A depicts a laptop computer equipped with switches, according to the present invention.

FIG. 2A depicts a laptop computer 10' that includes keyboard keyswitches 20', and other mechanical switches 30', such as the computer ON/OFF switch, which switches are moisture and dust resistant, according to the present invention. Shown in partial cutaway in FIG. 2A is keyboard keyswitch 20", attached to the motherboard or other substrate 40 and surrounded by a bellows-like flexible metal housing 100, according to the present invention. of course, moisture and dust resistant switches according to the present invention may be used on electronic equipment other than laptop computers.

FIG. 2B depicts a mechanical switch 30' mounted to a printed circuit board or other substrate 40 by leads 110, 120 and surrounded by a flexible-walled closed housing 100. The switch mechanism 60 is attached to an actuator shaft 130 that typically is normally biased away from the substrate 40. Shaft 130 may extend almost to the "roof" portion 132 of housing 100, or housing 100 may be formed with a shaft-like member 134 that extends toward shaft 130, but is spaced-apart a desired distance G under no load conditions. The gap distance G depends upon the switch application at hand, but will typically be about 1 mm. In either event, over compression and resultant over stressing of housing 100 is prevented by the length of shaft 130, and/or the length of member 134.

In the configuration of FIG. 2B, housing 100 has three convolutions (or pleats) 140, formed with a constant pitch P. A perimeter portion of housing 100 is attached to a region 150 of the typically plastic switch base housing 160 by ultrasonic welding, adhesive (e.g., epoxy) bonding, press fitting with a polymeric seal, or the like. (In the latter instance, reference numeral 150 in FIG. 2B may represent such a polymeric seal.)

Great leeway is provided in the design of housing 100. In the absence of a compressive force, housing 100 may have a wall thickness ranging from about 0.05 mm to about 0.15 mm, and an expanded length L ranging from perhaps 1 mm to 8 mm. While a greater value of L could be provided, too large a value for L could adversely affect packaging of the resultant switch. The housing diameter D may range from perhaps 2.6 mm to as large as perhaps 10 cm, and the actuator stroke ΔY may range from less than 1 mm to greater than 1 cm. Again, large dimensioned housings may be fabricated, but may adversely affect packaging of the resultant switch.

For a keyswitch 20", housing diameter D will range from about 3 mm to 10 mm (with about 6 mm preferred), the length L will range from about 1.5 mm to about 6 mm, displacement stroke ΔY will range from about 3 mm to about 8 mm (with about 7 mm preferred), and the wall thickness will preferably have a constant value in the range of about 0.06 mm to about 0.12 mm. A typical ON/OFF switch 30' might call for a housing diameter D of 10 mm, a length L of about 5 mm, and a displacement ΔY of perhaps 2 mm, and a wall thickness of about 0.12 mm. A generic general purpose switch might have L≈1.6 mm, D≈8 mm, an actuator displacement stroke ΔY≈1 mm, and wall thickness T of about 0.06 mm.

The fabrication of housing 100 is known to those skilled in the art. Commonly, housing 100 is fabricated using a technique analogous to the so-called "lost wax" process. A wax housing is fabricated to the desired size of housing 100, and is used to create a casting mold. The mold is then filled with molten nickel metal, which forms housing 100. Alternatively, the pleated regions 140 may be separately fabricated and welded together to produce a higher quality housing. However, the less expensive lost-wax type mass produced cast housings are rated for a lifetime of perhaps hundreds of millions of flexings and are cost competitive with prior art rubber housings. Nickel metal bellows similar to housing 100 have found use in the aircraft industry as pressure change monitors.

FIG. 2C shows a switch 30', during application of a compressive force F that produces an actuator stroke ΔY. The compressed switch shown in FIG. 2C could be identical with respect to pleat configuration to the uncompressed switch shown in FIG. 2B. However, the compressed switch of FIG. 2C is instead depicted with additional bellows and without a straight non-bellowed region, to indicate the design flexibility available when implementing switches according to the present invention. Note that as it is moved downward in FIG. 2C, a portion of shaft 130 moves into the switch mechanism 60. As noted, the combined lengths of actuator shaft 130 and member 134 prevent housing 100 from compressing more than a distance approximating ΔY, which protects the housing from overstress and possible breakage. In the configuration shown in FIG. 2C, the electrical contacts comprising switch 30' would normally be "ON", e.g., making contact. Of course, switch 30' could instead be wired to be normally "ON" in the configuration shown in FIG. 2B, and "OFF" in the configuration of FIG. 2C.

FIG. 2D depicts a configuration in which switch 30' includes a bellows-like housing 100 that is grounded, e.g., by soldering, at region 170 to ground regions on printed circuit board or substrate 40. In this fashion, switch mechanism 60 and the underlying board or substrate are shielded by housing 100 from static electric discharge, perhaps from a user touching switch 30' after walking across a floor and accumulating static electricity.

FIG. 2E depicts a switch 20' with a keycap 180 mounted atop housing 100, as might be used for the various keyboard keys on laptop computer 10' (see FIG. 2A). Of course, a keycap 180 could also be added to the switches shown in FIGS. 2B–2D.

FIG. 2F depicts the transfer function of actuator force (F) vs. travel (ΔY) for any of the switches shown in FIGS. 2B–2E. In practice, a substantially linear transfer function as shown by line 200 in FIG. 2F, is produced if convolutions 140 define a substantially constant pitch P and if the housing wall thickness T is substantially constant, as depicted in FIG. 2B. The same substantially constant transfer function may also result from increasing the number of convolutions on housing 100 while increasing the wall thickness T, or by decreasing the number of convolutions while providing a thinner wall thickness. For non-linear transfer functions, housing 100 may be formed with different diameter convolutions, and/or with convolutions of differing vertical heights, and/or differing thicknesses. If desired, a portion of the housing wall could include convolutions separated by region(s) of no convolutions.

For example, as shown by the phantom line graphs 210 or 220 in FIG. 2F, a switch designer can tailor the design of housing 100 to produce a desired non-linear transfer function. More specifically, the transfer function may be linear in a first region ($F \leq F_2$, $\Delta Y \leq \Delta Y_1$) with a first gain given by the slope in said region, and be linear in a second region ($F \leq F_1$, $\Delta Y \leq \Delta Y_2$) with a second, different, gain. (If desired, additional substantial linear regions with different gains could also be created.)

Assume, by way of example, that a total actuator distance $\Delta Y$ of 5 mm is desired, of which the first 1 mm should deflect with less force, e.g., graph 210. As shown by housing 100 in FIG. 2G, the resultant transfer function could be tailored by fabricating one or more uppermost convolutions 140' in housing 100 with a sidewall dimension T' that is thinner the sidewall dimension T" of remaining convolutions 140". Typically, the thinner-walled convolutions 140' will have a greater pitch separation P' than the separation P" associated with the thicker-walled convolutions 140".

FIG. 2H depicts a housing 100 whose uppermost convolution(s) 140" have a thicker wall dimension T" and smaller separation pitch P", than the wall dimension T' and separation pitch P' associated with the lower convolutions 140'. The resultant transfer function will be that of phantom line graph 220 in FIG. 2F, in which after an initial deflection, less force is needed to produce a given amount of travel $\Delta Y$. Some care must be exercised in designing the housing shown in FIG. 2H to avoid buckling in the presence of compressive force.

Modifications and variations may be made to the disclosed embodiments without departing from the subject and spirit of the invention as defined by the following claims.

What is claimed is:

1. A switch, comprising:
    a mechanical actuator responsive to actuation displacement force causing said mechanical actuator to enter a desired switch state; and
    a flexible-walled closed housing, surrounding said mechanical actuator, that is fabricated from a metal and includes first and second pleated regions having respective first and second housing wall thicknesses causing a transfer function of actuator force applied to said switch versus actuator travel to be substantially linear in a first region with a first gain and to be substantially linear in a second region with a second, different, gain.

2. The switch of claim 1, wherein:
    said mechanical actuator is attached to a substrate, and
    at least a portion of said flexible-walled closed housing is electrically connected to a ground portion of said substrate.

3. The switch of claim 1, wherein said switch is a keyboard keyswitch on a computer, and wherein said flexible-walled closed housing has at least one characteristic selected from the group consisting of (i) a wall thickness ranging from about 0.06 mm to 0.12 mm, (ii) a diameter ranging from about 3 mm to about 10 mm, (iii) a compressive actuation displacement distance ranging from about 2 mm to about 8 mm, and (iv) a housing material that includes nickel.

4. The switch of claim 1, wherein said switch is a keyboard keyswitch adapted to be used on a computer, and wherein said flexible-walled closed housing has a diameter of about 6 mm and said switch has a displacement stroke of about 7 mm.

5. The switch of claim 1, wherein said switch is adapted to be mounted for use on a computer and has a displacement of about 2 mm and wherein said flexible-walled closed housing has a diameter of about 10 mm.

6. The switch of claim 1, wherein a perimeter region of said flexible-walled closed housing is joined to a base region of said switch.

7. The switch of claim 6, wherein said perimeter region of said flexible-walled closed housing is joined to said base region of said switch using at least one technique selected from the group consisting of (i) insert molding, (ii) adhesive bonding, and (iii) press fitting with a polymeric seal.

8. The switch of claim 1, wherein said flexible-walled closed housing is sized and shaped as to cause a transfer function of actuator force applied to said switch versus actuator travel to be substantially linear.

9. A switch according to claim 1, wherein said housing includes a projecting member sized and disposed to limit compression of said housing.

10. A keyboard for a computer, comprising:
    a plurality of keyboard keyswitches, mounted to a substrate, each of said keyswitches including:
    a mechanical actuator responsive to actuation displacement force causing said mechanical actuator to enter a desired switch state; and
    a flexible-walled closed housing, surrounding said mechanical actuator, that is fabricated from a metal and includes first and second pleated regions having respective first and second housing wall thicknesses causing a transfer function of actuator force applied to said switch versus actuator travel to be substantially linear in a first region with a first gain and to be substantially linear in a second region with a second, different, gain.

11. The keyboard of claim 10, wherein:
    for each of said keyswitches, said mechanical actuator is attached to a substrate, and
    at least a portion of said flexible-walled closed housing is electrically connected to a ground portion of said substrate.

12. The keyboard of claim 10, wherein for at least one of said keyswitches, said flexible-walled closed housing has at least one characteristic selected from the group consisting of (i) a wall thickness ranging from about 0.06 mm to 0.12 mm, (ii) a diameter ranging from about 3 mm to about 10 mm, (iii) a compressive actuation displacement distance ranging from about 2 mm to about 8 mm, and (iv) a housing material that includes nickel.

13. The keyboard of claim 10, wherein for each of said keyswitches a perimeter region of said flexible-walled closed housing is joined to a base region of the keyswitch.

14. The keyboard of claim 10, wherein for each of said keyswitches said perimeter region of said flexible-walled closed housing is joined to said base region of the keyswitch using at least one technique selected from the group consisting of (i) insert molding, (ii) adhesive bonding, and (iii) press fitting with a polymeric seal.

15. The keyswitch of claim 10, wherein said flexible-walled closed housing is sized and shaped as to cause a transfer function of actuator force applied to said switch versus actuator travel to be substantially linear.

16. The keyboard of claim 10, wherein said housing includes a projecting member sized and disposed to limit compression of said housing.

17. A method of housing a mechanical actuator responsive to actuation displacement force causing said mechanical actuator to enter a desired switch state, the method comprising the following steps:
    (a) surrounding said mechanical actuator with a flexible-walled closed housing that is fabricated from a metal and includes first and second pleated regions having respective first and second housing wall thicknesses causing a transfer function of actuator force applied to said mechanical actuator versus actuator travel to be substantially linear in a first region with a first gain and to be substantially linear in a second region with a second, different, gain.

18. The method of claim 17, wherein said mechanical actuator is attached to a substrate, and further including:

(b) electrically connecting at least a portion of said flexible-walled closed housing to a ground portion of said substrate.

19. The method of claim 17, wherein at step (a) said flexible-walled closed housing is sized and shaped as to cause a transfer function of actuator force applied to said switch versus actuator travel to be substantially linear.

20. The method of claim 17, further including a step of providing said housing with a projecting member sized and disposed to limit compression of said housing.

21. The method of claim 17, wherein step (a) includes providing a said flexible-walled closed housing fabricated from a metal including nickel.

* * * * *

UNITED STATES PATENT AND TRADEMARK OFFICE
CERTIFICATE OF CORRECTION

PATENT NO. : 5,626,222
DATED : May 6, 1997
INVENTOR(S) : Rafael E. Aguilera

It is certified that error appears in the above-identified patent and that said Letters Patent is hereby corrected as shown below:

On the title page item [73], insert --NCR Corporation, Dayton, Ohio--

On the title page item [56], insert --Attorney, Agent or Firm--Michael A. Kaufman--

Signed and Sealed this

Third Day of November, 1998

Attest:

BRUCE LEHMAN

*Attesting Officer*                *Commissioner of Patents and Trademarks*